United States Patent
Pulido et al.

(10) Patent No.: US 12,393,964 B2
(45) Date of Patent: Aug. 19, 2025

(54) SYSTEMS AND METHODS FOR INSERTING CONTEXTUAL ADVERTISEMENTS INTO A VIRTUAL ENVIRONMENT

(71) Applicant: Adeia Guides, Inc., San Jose, CA (US)

(72) Inventors: Alejandro Sanchez Pulido, Chatsworth, CA (US); Carla Mack, Los Angeles, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/734,559

(22) Filed: Jun. 5, 2024

(65) Prior Publication Data

US 2024/0320712 A1 Sep. 26, 2024

Related U.S. Application Data

(63) Continuation of application No. 18/239,598, filed on Aug. 29, 2023, now Pat. No. 12,033,187, which is a continuation of application No. 17/739,434, filed on May 9, 2022, now Pat. No. 11,776,017, which is a continuation of application No. 17/218,846, filed on
(Continued)

(51) Int. Cl.
| | | |
|---|---|---|
| G06Q 30/02 | (2023.01) | |
| G06Q 30/0251 | (2023.01) | |
| G06T 3/60 | (2006.01) | |
| G06T 11/60 | (2006.01) | |
| G10L 25/54 | (2013.01) | |

(52) U.S. Cl.
CPC ........... *G06Q 30/0269* (2013.01); *G06T 3/60* (2013.01); *G06T 11/60* (2013.01); *G10L 25/54* (2013.01)

(58) Field of Classification Search
CPC ........... G06Q 30/0269; G06Q 30/0276; G06Q 30/02; G06Q 30/0207–30/0277; G06T 3/60; G06T 11/60; G10L 25/54
See application file for complete search history.

(56) References Cited

U.S. PATENT DOCUMENTS

| | | | | |
|---|---|---|---|---|
| 6,864,886 B1 * | 3/2005 | Cavallaro | ............... | H04N 5/265 |
| | | | | 348/E5.051 |
| 7,743,330 B1 * | 6/2010 | Hendricks | ............... | G11B 27/28 |
| | | | | 715/723 |

(Continued)

FOREIGN PATENT DOCUMENTS

CN 107241610 A * 5/2017

OTHER PUBLICATIONS

PCT International Search Report and Written Opinion for International Application No. PCT/US2019/067245 dated Mar. 24, 2020(12 pages).
(Continued)

*Primary Examiner* — Thuy N Nguyen
(74) *Attorney, Agent, or Firm* — Haley Guiliano LLP

(57) ABSTRACT

Systems and methods are described herein for inserting contextual advertisements into a virtual environment. While presenting a virtual environment, a media device receives speech input. The media device selects an advertisement from an advertisement database based on the speech. The media device then determines the current environment of the virtual environment and generates a virtual object that is related to the current environment. The media device overlays the selected advertisement over the generated virtual object and displays the generated virtual object in the virtual environment.

20 Claims, 12 Drawing Sheets

Related U.S. Application Data

Mar. 31, 2021, now Pat. No. 11,354,707, which is a continuation of application No. 16/226,955, filed on Dec. 20, 2018, now Pat. No. 10,997,630.

(56) References Cited

U.S. PATENT DOCUMENTS

| | | | |
|---|---|---|---|
| 8,814,696 B2* | 8/2014 | Marsland | H04L 67/38 463/42 |
| 10,015,473 B2* | 7/2018 | Ito | H04N 13/156 |
| 10,339,721 B1* | 7/2019 | Dascola | G06F 3/0485 |
| 11,776,017 B2 | 10/2023 | Pulido et al. | |
| 12,033,187 B2 | 7/2024 | Pulido et al. | |
| 2003/0014423 A1* | 1/2003 | Chuah | G06F 16/958 707/999.102 |
| 2004/0104935 A1* | 6/2004 | Williamson | G06V 10/10 715/757 |
| 2006/0105841 A1* | 5/2006 | Rom | G07F 17/3227 463/42 |
| 2008/0262911 A1* | 10/2008 | Altberg | G06Q 30/0277 705/14.73 |
| 2009/0232354 A1 | 9/2009 | Camp et al. | |
| 2010/0122286 A1* | 5/2010 | Begeja | H04N 21/2543 725/34 |
| 2010/0142928 A1* | 6/2010 | Rohde | H04N 5/272 382/284 |
| 2010/0169837 A1* | 7/2010 | Hyndman | G06F 16/9566 715/848 |
| 2010/0180296 A1* | 7/2010 | Hendricks | H04N 21/2543 725/34 |
| 2010/0205035 A1* | 8/2010 | Baszucki | G06Q 20/102 705/40 |
| 2012/0113228 A1* | 5/2012 | Konno | H04N 13/356 348/47 |
| 2012/0167134 A1* | 6/2012 | Hendricks | G06T 11/60 725/32 |
| 2012/0259712 A1* | 10/2012 | Hyndman | G06Q 30/0256 705/14.73 |
| 2013/0006734 A1* | 1/2013 | Ocko | G06Q 30/02 705/14.57 |
| 2013/0124311 A1* | 5/2013 | Sivanandan | G06Q 30/02 705/14.51 |
| 2013/0297409 A1* | 11/2013 | Jones | H04L 12/1827 705/14.45 |
| 2014/0006150 A1* | 1/2014 | Thompson | G06Q 30/0251 705/14.53 |
| 2014/0058807 A1* | 2/2014 | Altberg | G06Q 30/0241 705/14.4 |
| 2014/0135744 A1* | 5/2014 | Stein | A61B 5/066 606/1 |
| 2015/0302649 A1* | 10/2015 | Komatsu | G06T 7/70 345/633 |
| 2017/0094007 A1* | 3/2017 | Demsey | G06F 16/958 |
| 2018/0225911 A1 | 8/2018 | Washington et al. | |
| 2018/0315248 A1* | 11/2018 | Bastov | G06F 3/011 |
| 2019/0073820 A1* | 3/2019 | Barron | G06T 15/506 |
| 2019/0172271 A1* | 6/2019 | Yasuda | G06F 3/011 |
| 2019/0230290 A1* | 7/2019 | Yasuda | G03B 15/00 |
| 2019/0371279 A1* | 12/2019 | Mak | G06F 3/147 |
| 2020/0160602 A1* | 5/2020 | Ghatak | G06F 3/017 |
| 2020/0413021 A1* | 12/2020 | Sato | G06F 3/16 |
| 2021/0193084 A1* | 6/2021 | Deliz Centeno | G06F 3/011 |
| 2023/0032565 A1 | 2/2023 | Pulido et al. | |
| 2023/0410154 A1 | 12/2023 | Pulido et al. | |

OTHER PUBLICATIONS

Lopez-Nores, et al., "MiSPOT: dynamic product placement for digital TV through MPEG-4 processing and semantic reasoning," Knowledge and Information Systems 22:101-128 (2010).

* cited by examiner

600

| Product 602 | Brand 604 | Expiration 606 |
|---|---|---|
| Game | SEGA | End of segment |
| Vehicle | Cadillac | Does not expire |
| Pizza 608 | Joe's Pizza 610 | 10:00 PM 612 |
| Detergent | Tide | End of segment |
| Cereal | General Mills | 11:00 AM |
| Vacation package | Royal Caribbean | 2 weeks |

FIG. 6

SYSTEMS AND METHODS FOR INSERTING CONTEXTUAL ADVERTISEMENTS INTO A VIRTUAL ENVIRONMENT

CROSS-REFERENCE TO RELATED APPLICATIONS

This application is a continuation of U.S. patent application Ser. No. 18/239,598, filed Aug. 29, 2023, which is a continuation of U.S. patent application Ser. No. 17/739,434, filed May 9, 2022, now U.S. Pat. No. 11,776,017, which is a continuation of U.S. patent application Ser. No. 17/218, 846, filed Mar. 31, 2021, now U.S. Pat. No. 11,354,707, which is a continuation of U.S. patent application Ser. No. 16/226,955, filed Dec. 20, 2018, now U.S. Pat. No. 10,997, 630. The disclosures of which are hereby incorporated by reference herein in their entireties.

BACKGROUND

The present disclosure relates to content delivery and consumption systems and, more particularly, advertisement insertion in virtual environments.

SUMMARY

Advertisement insertion in media content takes several forms. Preselected advertisements or targeted advertisements may be inserted into traditional forms of media content at predefined insertion points or triggered by user input. Virtual environments, however, do not easily lend themselves to traditional advertisement insertion techniques. A user may interact with a virtual reality video game in which the user may freely move about the game environment. Sudden and intrusive insertion of advertisements disrupts the user's experience. A user may be participating in a virtual meeting and cannot be distracted by traditional advertisements. Thus, a method of inserting advertisements into virtual environments in a natural, unobtrusive way is required.

Systems and methods are described herein for generating a virtual object for insertion into a virtual environment on which a contextual advertisement may be placed. Virtual objects may be introduced into a virtual environment in a natural way. For example, if the environment displayed in the virtual environment is a city street, a new vehicle can be inserted as driving into view on the street. Such object insertion is unobtrusive and does not disrupt the user's experience. A contextual advertisement can then be displayed on the vehicle so that the user views the advertisement as the vehicle drives through the user's field of view.

While presenting a virtual environment, a media device receives speech input. The media device selects an advertisement from an advertisement database based on the speech. The media device then determines the current environment of the virtual environment and generates a virtual object that is related to the current environment. The media device overlays the selected advertisement over the generated virtual object and displays the generated virtual object.

The media device may identify a plurality of virtual objects currently being displayed in the virtual environment and retrieve metadata of one of the displayed virtual objects. The media device determines whether the metadata of the virtual object uniquely identifies a single environment. If so, the media device identifies the single environment as the current environment. If not, the media device retrieves metadata for additional virtual objects until a unique environment is identified. The media device may identify a unique environment from a single virtual object or may compare sets of environments identified by a number of virtual objects to find a single environment common to all the sets of environments.

The media device may determine whether a virtual object currently displayed in the virtual environment is suitable for displaying the selected advertisement and generate a new virtual object only if no suitable virtual object is currently displayed. To determine if a suitable virtual object is currently being displayed, the media device identifies a plurality of virtual objects currently being displayed in the virtual environment, and further identifies a respective type of each of the virtual objects. The media device then determines whether any of the virtual objects is of a type that is suitable for displaying the selected advertisement.

To display the selected advertisement on a virtual object, the media device identifies a surface of the virtual object suitable for displaying the selected advertisement and displays the selected advertisement on the identified surface. The media device may determine an orientation of the virtual object and transform an image of the selected advertisement to match the orientation of the virtual object.

To select an advertisement, the media device identifies a category of advertisement related to the speech and determines a particular advertisement based on a user profile and the identified category. The media device then selects that particular advertisement from the advertisement database for display.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6 is a diagram showing selection of an advertisement for insertion based on user preferences in accordance with some embodiments of the disclosure;

DETAILED DESCRIPTION

Figure 1:
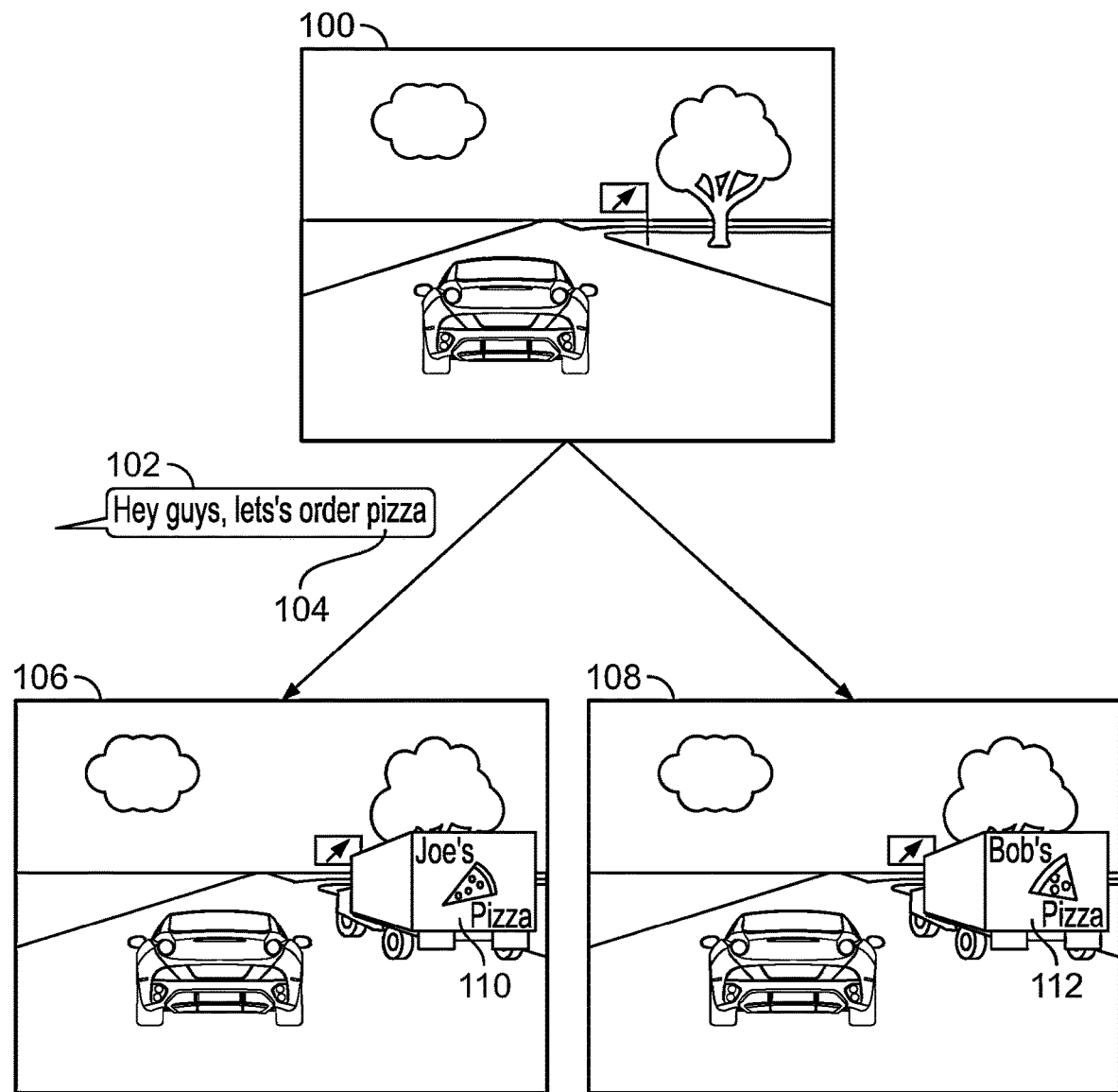
FIG. 1 shows a generalized embodiment of insertion of a contextual advertisement in a virtual environment in accordance with some embodiments of the disclosure.

FIG. 1 depicts a virtual environment 100 as viewed from a user's perspective on a media device. Virtual environment 100 may be a video game in which the user is participating with several other users. The users may communicate 102 with each other through the video game, either vocally or with text messages. During gameplay, a user may ask other users if, for example, they should break from the video game to order pizza. The media device monitors the communications and detects a keyword 104 "pizza." In response to detecting the keyword, the media device retrieves an advertisement for a product matching the keyword from an advertisement database. The specific advertisement retrieved may be influenced by the preference of a particular user. For example, in response to the keyword "pizza," a first user's media device may retrieve an advertisement for "Joe's Pizza" while a second user's media device may retrieve an advertisement for "Bob's Pizza." The virtual environment 106, presented on the first user's media device, is modified by the first media device to include a new virtual object on which is displayed the "Joe's Pizza" advertisement 110. Likewise, the virtual environment 108, presented on the second user's media device, is modified by the second media device to include a new virtual object on which is displayed the "Bob's Pizza" advertisement 112. It should be noted that while FIG. 1 depicts insertion of the same virtual object in both virtual environments 106 and 108, each media device may select any appropriate virtual object on which to display the selected advertisement, as described below.

Figure 2:
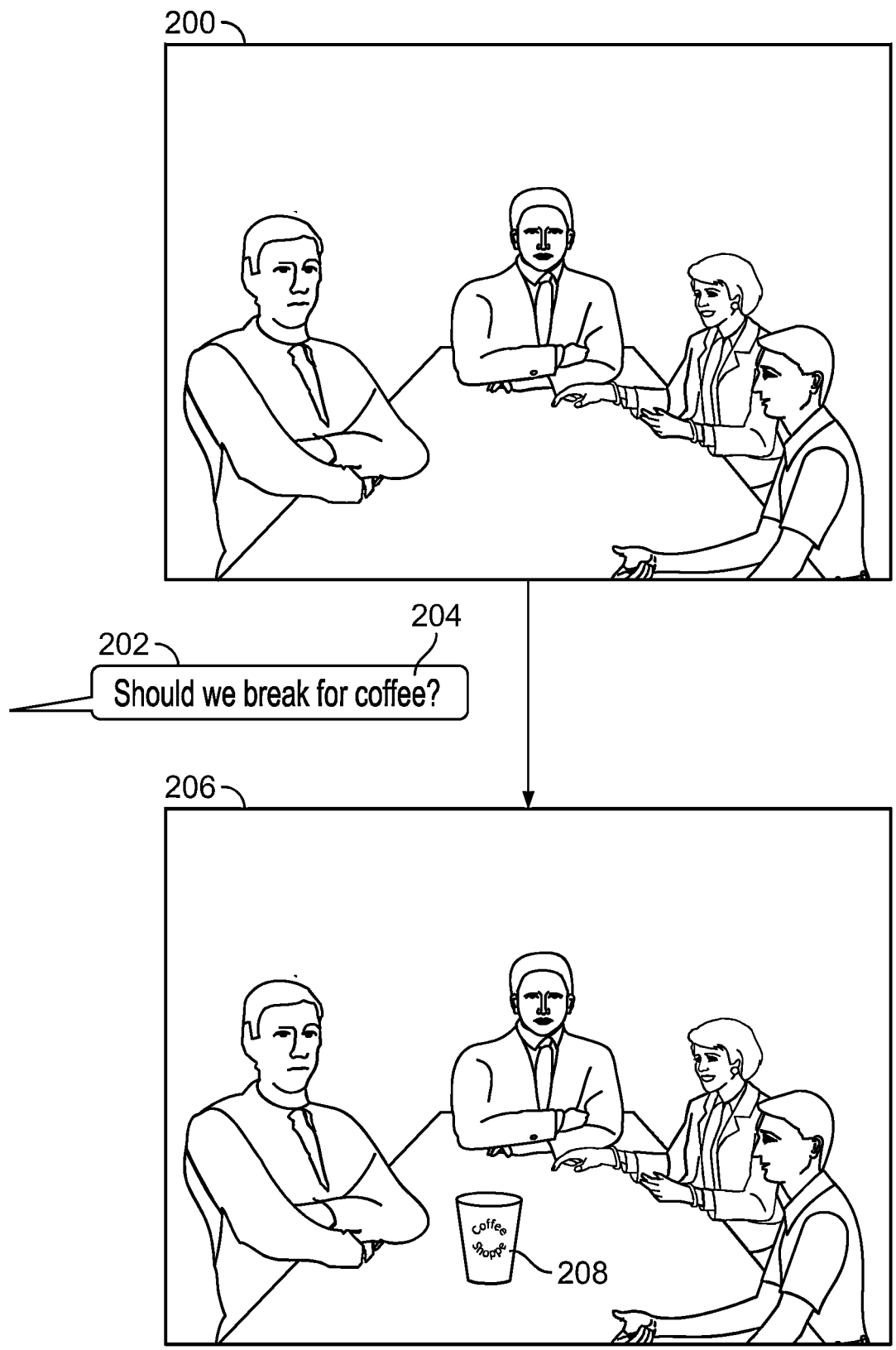
FIG. 2 shows a second generalized embodiment of insertion of a contextual advertisement in a virtual environment in accordance with some embodiments of the disclosure.

FIG. 2 depicts a virtual environment 200, which is a virtual meeting. During the meeting, a participant may, for example, suggest 202 breaking for coffee. As above, the media device through which the meeting is being presented monitors the participants' speech for keywords and detects the keyword 204 "coffee." In response to detecting the keyword, the media device retrieves a coffee advertisement from an advertisement database and generates a new virtual object on which to display the advertisement. The virtual object 208 is then displayed.

Figure 3:
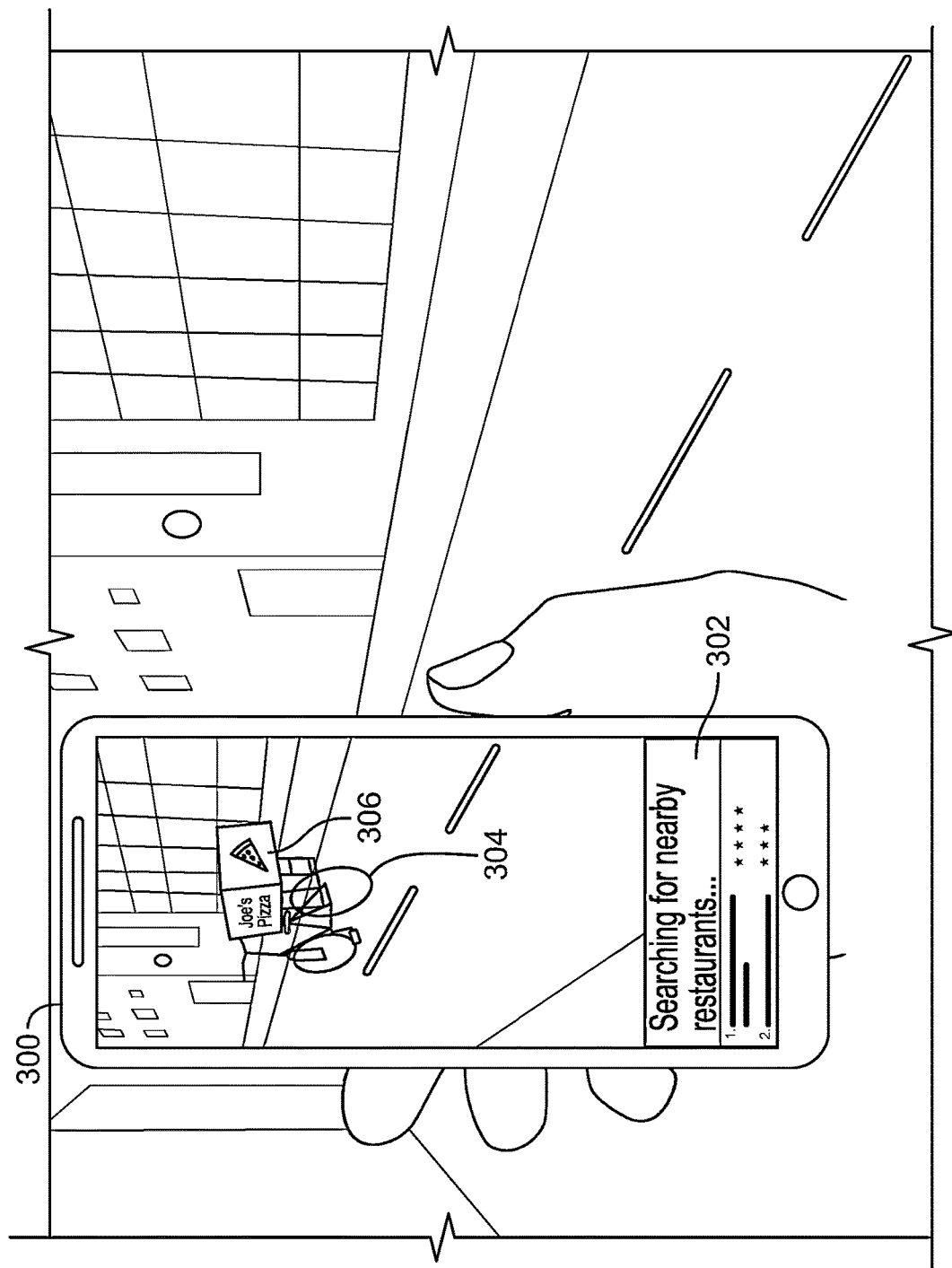
FIG. 3 shows a third generalized embodiment of insertion of a contextual advertisement in a virtual environment in accordance with some embodiments of the disclosure.

FIG. 3 depicts an augmented reality display on a media device 300. A user may enter a search 302 on media device 300 for nearby restaurants. Media device 300 may access an advertisement database and retrieve an advertisement for a local restaurant. Media device 300 may use user preferences to determine a type of restaurant for which an advertisement should be retrieved. For example, media device 300 may determine that the user likes pizza and retrieves an advertisement for "Joe's Pizza" from the advertisement database. Media device 300 captures an image of the surrounding environment using a built-in camera and determines an appropriate virtual object to overlay over the image. For example, media device 300 determines that the user is on a city street. Based on the determined environment, media device 300 selects a delivery bicycle 304 on which to display the retrieved advertisement 306. Media device 300 overlays the bicycle with the advertisement over the captured image. The position of the virtual object may be static or animated so as to move along the street. Animation of the virtual object may be linked to movement of the media device 300 in order to keep the virtual object displayed for a longer period of time.

Figure 4:
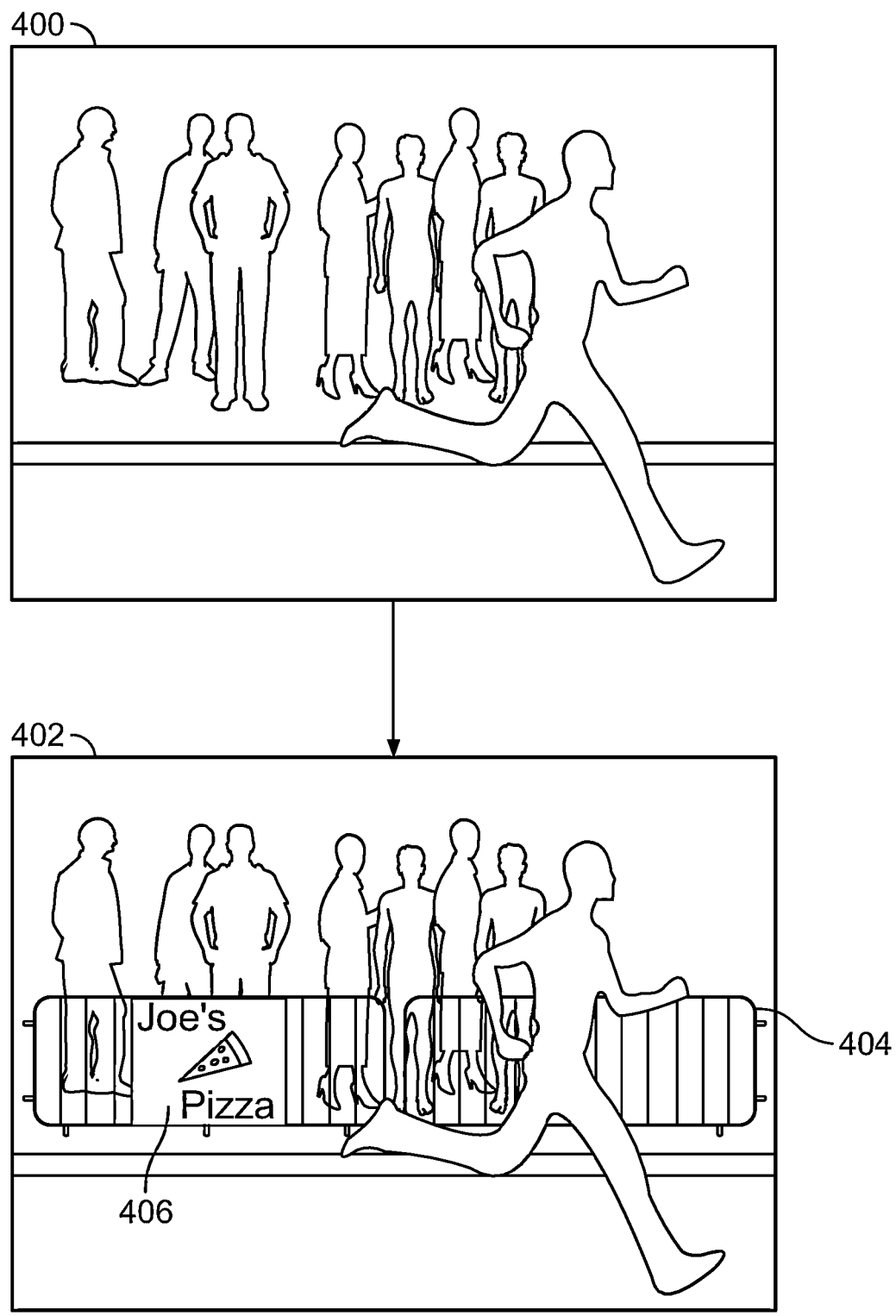
FIG. 4 shows a fourth generalized embodiment of insertion of a contextual advertisement in a virtual environment in accordance with some embodiments of the disclosure.

FIG. 4 depicts a virtual environment 400 with which users cannot interact, such as a cutscene in a video game, or broadcast video content. In response to detecting the keyword "pizza," as above, the media device on which the virtual environment is presented determines the currently depicted environment and selects a virtual object to insert into the virtual environment on which to display an advertisement. In the example of FIG. 4, the environment is a race. A runner is displayed running past a crowd of spectators. The media device determines that a barrier 404 may be placed between the runner and the spectators and provides a suitable surface on which to display the selected advertisement 406.

Figure 5:
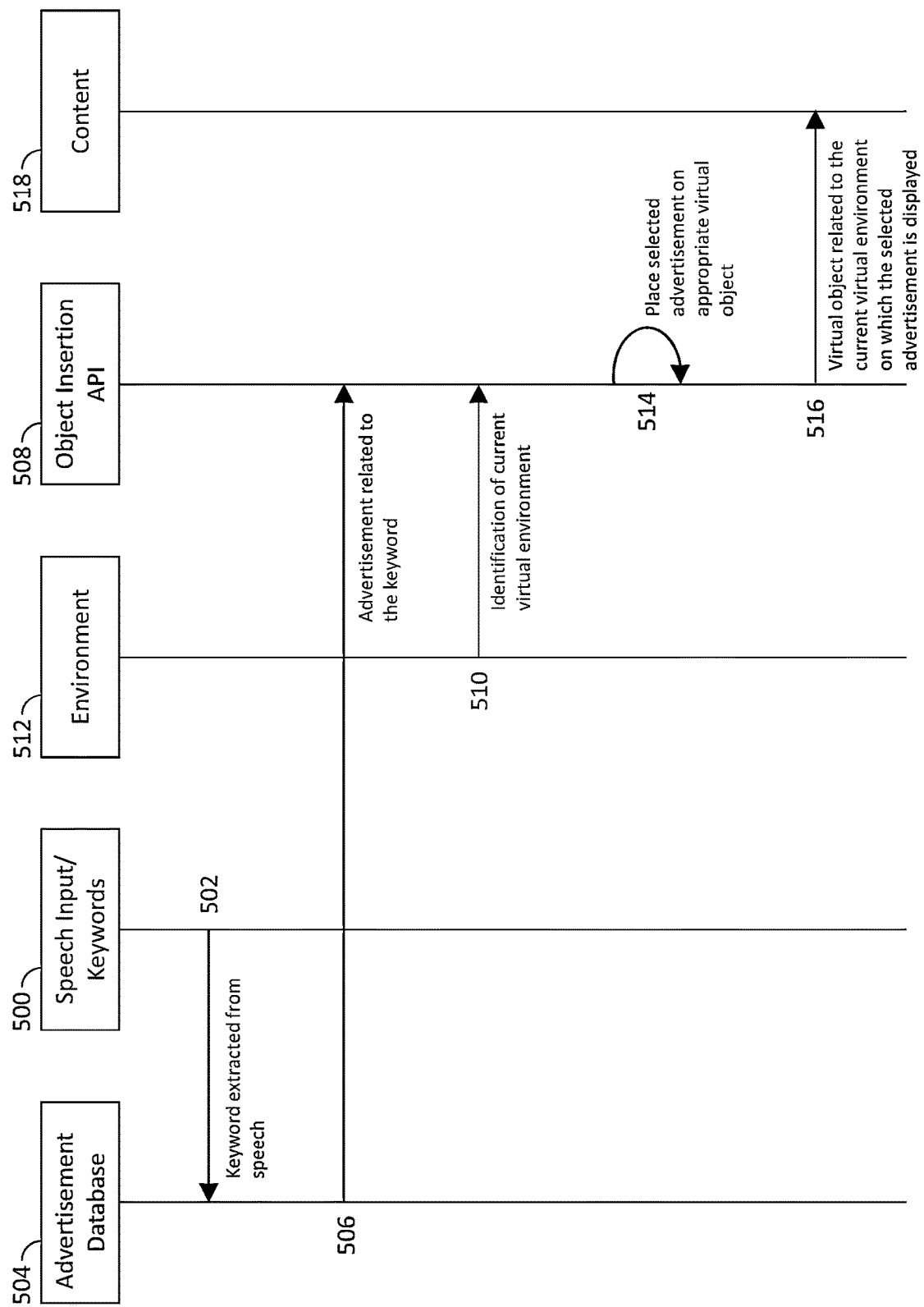
FIG. 5 is a data flow diagram for insertion of a contextual advertisement in a virtual environment in accordance with some embodiments of the disclosure.

FIG. 5 is a data flow diagram for insertion of a contextual advertisement in a virtual environment. A media device, such as media device 300, receives user speech at speech input 500. The media device identifies and extracts from the speech a keyword and, at 502, uses the keyword to retrieve an advertisement from advertisement database 504. At 506, at advertisement related to the keyword is transferred from the advertisement database 504 to an object insertion API 508. At 510, an identifier of the current virtual environment is retrieved by the object insertion API 508 from the current environment 512. At 514, the object insertion API 508 selects a virtual object related to the current environment using the identifier of the current environment and places the retrieved advertisement on the selected virtual object. At 516, object insertion API 508 inserts the virtual object into the displayed content 518.

FIG. 6 is a diagram showing selection of an advertisement for insertion based on user preferences. Table 600 represents a set of user preferences for various products. User preferences may be learned from monitoring user behaviors, such as Internet shopping, Internet search histories, content consumption histories, and the like. User preferences may be stored on a media device or on a remote server accessible by a media device. Stored user preferences may include product 602, specific brands 604 for each product, and an expiration date or time 606 for each product/brand association. For example, for the product "pizza" 608, a user may prefer "Joe's Pizza" 610, which may be learned from the user's order history using services such as Seamless®, GrubHub® or Uber Eats®. The media device may monitor the time of such orders and determine that the user never orders pizza after 10:00 PM. The media device therefore sets the expiration 612 for "Joe's Pizza" as 10:00 PM to prevent pizza advertisements from being presented to the user at times when the user would not order pizza.

Figure 7:
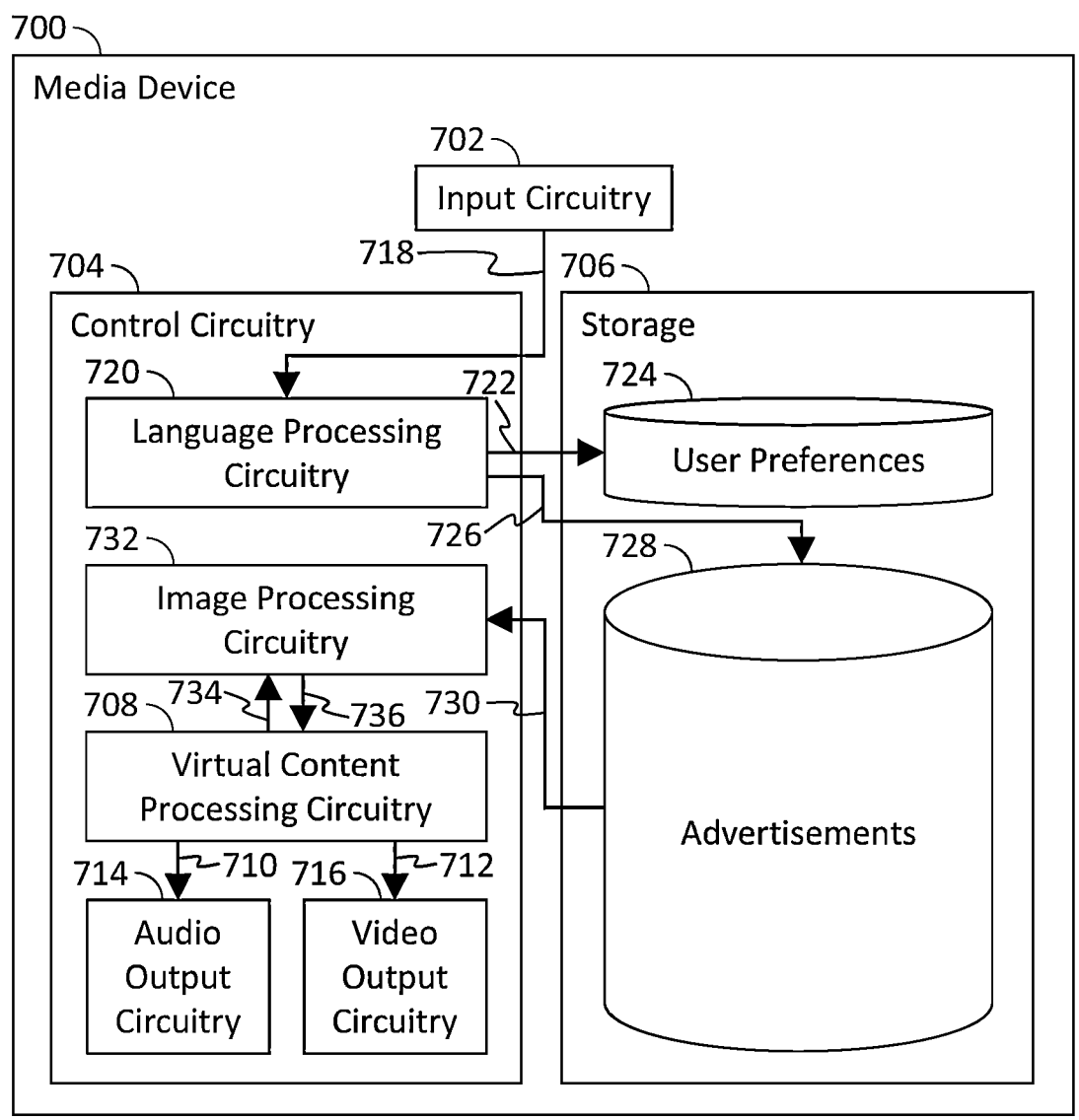
FIG. 7 is a block diagram representing control circuitry and data flow within a media device for insertion of a contextual advertisement in a virtual environment in accordance with some embodiments of the disclosure.

FIG. 7 is an illustrative block diagram representing circuitry and data flow within a media device 700 in accordance with some embodiments of the disclosure. Media device 700 may be any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smart phone, or any other television equipment, computing equipment, or wireless device, and/or combination of the same. Media device 700 comprises input circuitry 702. Input circuitry 702 may include a microphone and voice processing circuitry for receiving voice commands. Media device 700 also comprises control circuitry 704 and storage 706. Control circuitry 704 may be based on any suitable processing circuitry and comprises control circuits and memory circuits that may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software. Input circuitry 702 may be integrated with control circuitry 704. Storage 706 may be any device for storing electronic data, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same.

Control circuitry 704 comprises virtual content processing circuitry 708. Virtual content processing circuitry 708 processes two- and three-dimensional video content and associated audio content, which may be received via a physical RF channel over a cable television connection or terrestrial broadcast, or may be received over an Internet connection from an over-the-top (OTT) service using a wired connection (e.g., Ethernet) or wireless connection (e.g., 802.11a/b/g/n (WiFi), WiMax, GSM, UTMS, CDMA, TDMA, 3G, 4G, 4G LTE, or any other suitable type of wireless data transmission). Virtual content processing circuitry 708 transfers audio data 710 and video data 712 of the virtual content to audio output circuitry 714 and video output circuitry 716, respectively.

During presentation of the virtual content, input circuitry 702 receives user speech. Input circuitry 702 transfers 718 the speech to control circuitry 704 where it is received by language processing circuitry 720. Language processing circuitry 720 processes the speech using any known suitable speech processing technique to identify individual words. Language processing circuitry 720 compares 722 the identified words to product-related keywords in user preferences 724 stored in storage 706. If a keyword is detected in the speech, control circuitry 704 accesses 726 advertisements database 728 in storage 706. For example, language processing circuitry 720 uses the detected keyword to query the advertisements database 728 for an advertisement related to the detected keyword. The query may also contain a specific brand identified by user preferences 724 as being associated with the keyword. An advertisement is then selected and returned 730 from the advertisements database 728 to control circuitry 704, where it is received by image processing circuitry 732.

Control circuitry 704, using virtual content processing circuitry 708, determines a current environment of the virtual content. For example, virtual content processing circuitry 708 may access metadata of the virtual environment to identify a current environment (e.g., mountain, beach, city street, etc.). Alternatively, virtual content processing circuitry 708 may identify a number of virtual objects currently being displayed in the virtual environment. Virtual content processing circuitry 708 may access metadata or other identifying information for each displayed virtual object to determine an environment in which the respective virtual object belongs. For example, a stop sign may be displayed on a city street while a jellyfish may be displayed at a beach. Once the current environment has been identified, virtual content processing circuitry 708 selects a virtual object on which to display the selected advertisement. In some cases, a currently displayed object may be suitable for displaying the selected advertisement. If no currently displayed object is suitable for displaying the selected advertisement, virtual content processing circuitry 708 may select a suitable object appropriate to the current environment from a library of objects. Virtual content processing circuitry transfers the selected virtual object, or geometric and topological parameters thereof, to image processing circuitry 732. Image processing circuitry 732 processes the selected advertisement for display on a surface of the selected virtual object. For example, image processing circuitry 732 may transform the selected advertisement to match the tilt, skew, or viewing angle of a surface of the selected virtual object and place it on the surface. The modified virtual object is then transferred 736 from image processing circuitry 732 to virtual content processing circuitry 708 for insertion to the virtual environment.

Figure 8:
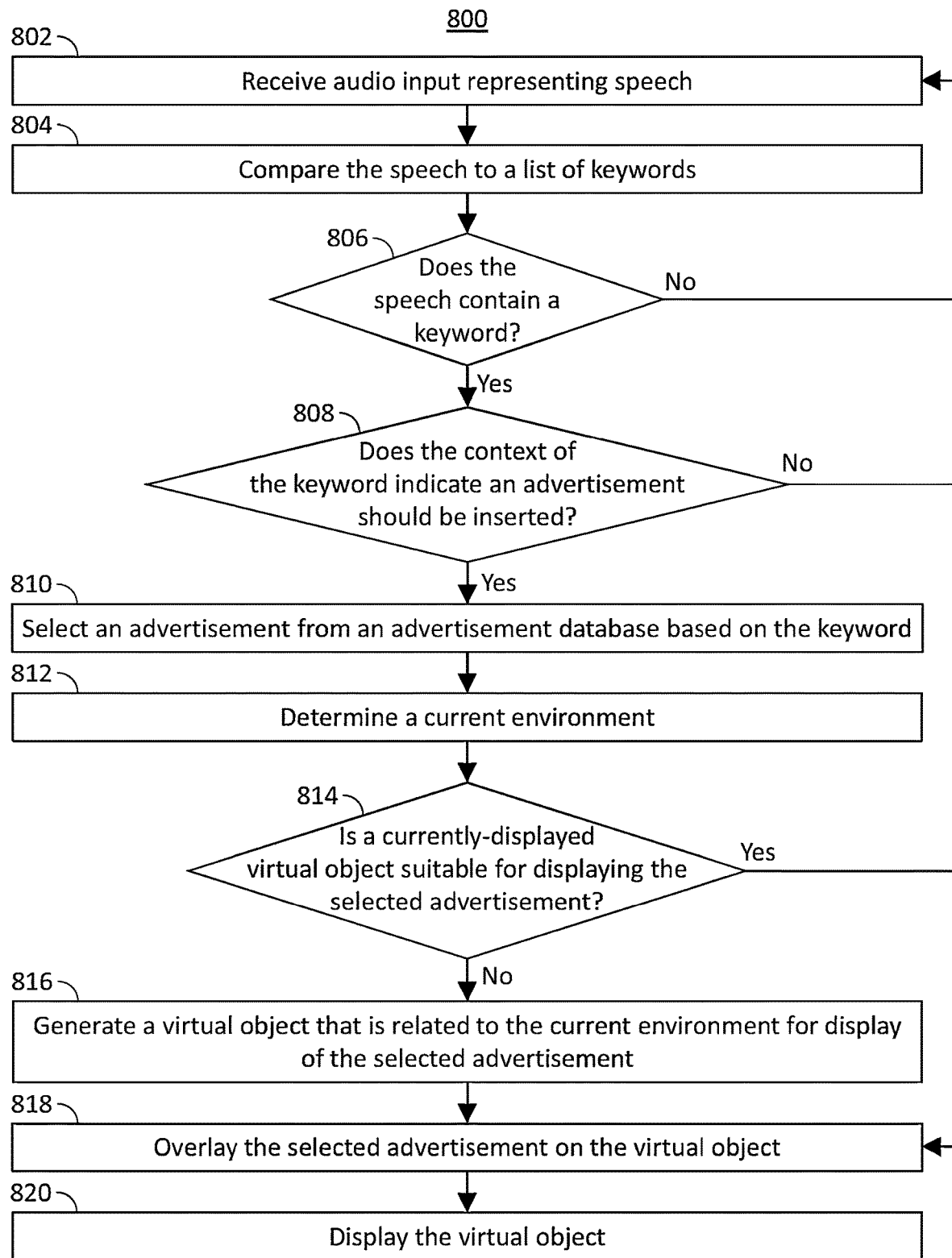
FIG. 8 is a flowchart representing a process for inserting a contextual advertisement in a virtual environment in accordance with some embodiments of the disclosure.

FIG. 8 is a flowchart representing an illustrative process for inserting a contextual advertisement in a virtual environment in accordance with some embodiments of the disclosure. The process 800 represented in FIG. 8 may be implemented on control circuitry 704, and one or more actions of process 800 may be incorporated into or combined with one or more actions of any other process or embodiment described herein.

At 802, control circuitry 704 receives, from input circuitry 702, audio input representing speech. For example, input circuitry 702 may include a microphone for receiving audio input from users. Alternatively or additionally, input circuitry 702 may include wireless receiver circuitry for receiving analog and/or digital audio signals via radio, Bluetooth, WiFi, or any other suitable transmission protocol. Input circuitry 702 transfers the audio signal to control circuitry 704 for processing. Control circuitry 704, using language processing circuitry 720, processes the audio signal to identify individual words contained in the speech. Language processing circuitry 720 may use any suitable speech processing technique.

At 804, control circuitry 704 compares the words contained in the speech to a list of keywords. Control circuitry 704 accesses a list of keywords from storage 706. The keywords may be stored as part of user preferences 724. For example, certain generic product types such as "car," "game," or "pizza" may be keywords. At 806, control circuitry 704 determines whether the speech contains a keyword. If not, control circuitry 704 continues to monitor received speech. If a keyword is contained in the speech, then, at 808, control circuitry 704 determines whether the context of the keyword indicates that an advertisement should be inserted. For example, language processing circuitry 720 analyzes the sentence in which the keyword was detected. If the keyword was the subject of a question, such as "Should we order pizza?", language processing circuitry 720 determines that an advertisement for pizza should be inserted. However, if the keyword was said in passing, such as "I had pizza for dinner last night", language processing circuitry 720 determines that an advertisement for pizza should not be inserted.

If an advertisement should be inserted, then, at 810, control circuitry 704 selects an advertisement from an advertisement database based on the keyword. Control circuitry 704 may query the advertisement database for ad advertisement related to the keyword "pizza." Control circuitry 704 may also access user preferences 724 to retrieve a specific brand associated with the keyword. For example, user preferences may associate "Joe's Pizza" with the keyword "pizza." Control circuitry 704 therefore queries the advertisement database for a "Joe's Pizza" advertisement.

At 812, control circuitry 704 determines a current environment of the virtual environment. Control circuitry 704, using virtual content processing circuitry 708, determines a particular environment or setting (e.g., city street, beach, mountain) being displayed in the virtual environment. This may be accomplished by accessing metadata of the virtual environment, or by using methods described below in connection with FIGS. 9 and 10.

At 814, control circuitry 704 determines whether a currently displayed virtual object is suitable for displaying the selected advertisement. This may be accomplished using methods described below in connection with FIG. 11. If no currently displayed virtual object is suitable for displaying the selected advertisement then, at 816, control circuitry 704 generates a virtual object that is related to the current environment for display of the selected advertisement. This may be accomplished using methods described below in connection with FIG. 15. At 818, control circuitry 704 overlays the selected advertisement on either the generated virtual object or the suitable currently displayed virtual object. At 820, control circuitry 704 displays the virtual object with the selected advertisement overlaid on it.

The actions or descriptions of FIG. 8 may be used with any other embodiment of this disclosure. In addition, the actions and descriptions described in relation to FIG. 8 may be done in suitable alternative orders or in parallel to further the purposes of this disclosure.

Figure 9:
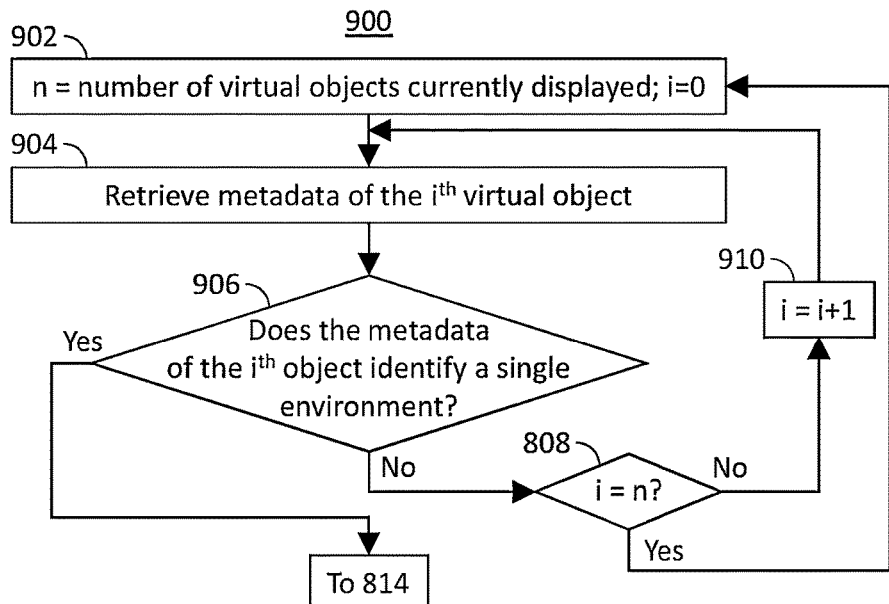
FIG. 9 is a flowchart representing a process for identifying a current environment in accordance with some embodiments of the disclosure.

FIG. 9 is a flowchart representing an illustrative process for identifying a current environment in accordance with some embodiments of the disclosure. The process 900 represented in FIG. 9 may be implemented on control circuitry 704, and one or more actions of process 900 may be incorporated into or combined with one or more actions of any other process or embodiment described herein.

At 902, control circuitry 704 identifies the number of virtual objects currently being displayed and initializes a counter variable i with a value of 0. To identify the number of virtual objects being displayed, control circuitry 704 may poll, query, or otherwise request from virtual content processing circuitry 708 an index, list, array, database, or other data structure containing at least one identifier of each virtual object currently being processed by virtual content processing circuitry 708 for display in the virtual environment. At 904, control circuitry 704 retrieves metadata of $i^{th}$ virtual object. Control circuitry 704 may retrieve metadata from the virtual content directly or may retrieve an identifier of the virtual object and query a virtual object library database using the identifier.

At 906, control circuitry 704 determines whether the metadata of the virtual object identifies a single environment. For example, metadata for a palm tree may identify a beach environment but may also identify a city street environment in a tropical climate. A surfer on a surfboard, however, might identify only a beach because no other environment would include such an object. If a single environment is identified, then processing proceeds to 814 above. If more than one environment is identified, then, at 808, control circuitry determines whether metadata for all currently displayed virtual objects has been retrieved. If not, then, at 910, control circuitry increments the value of i, and processing returns to 904. If metadata for all currently displayed objects has been retrieved, then processing return to 902, where control circuitry 704 again identifies a number of virtual objects currently displayed.

The actions or descriptions of FIG. 9 may be used with any other embodiment of this disclosure. In addition, the actions and descriptions described in relation to FIG. 9 may be done in suitable alternative orders or in parallel to further the purposes of this disclosure.

Figure 10:
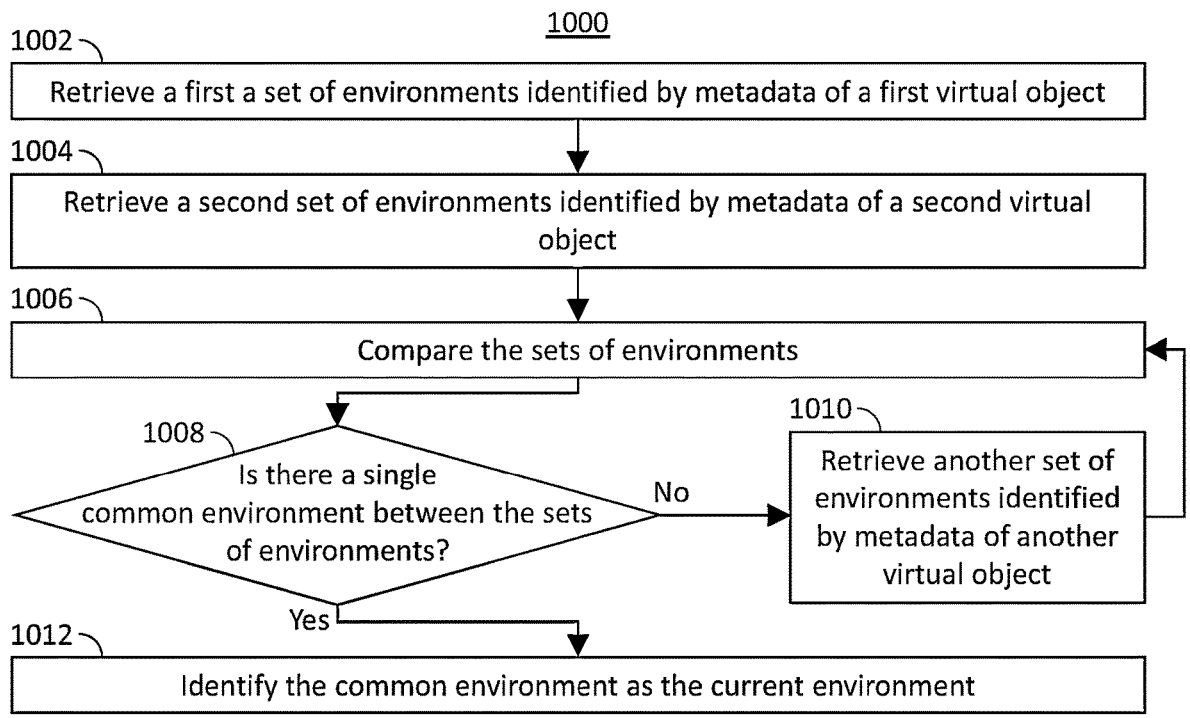
FIG. 10 is a flowchart representing a second process for identifying a current environment in accordance with some embodiments of the disclosure.

FIG. 10 is a flowchart representing a second illustrative process for identifying a current environment in accordance with some embodiments of the disclosure. The process 1000 represented in FIG. 10 may implemented on control circuitry 704, and one or more actions of process 1000 may be incorporated into or combined with one or more actions of any other process or embodiment described herein.

At 1002, control circuitry 704 retrieves a first set of environments identified by metadata of a first virtual object. At 1004, control circuitry 704 retrieves a second set of environments identified by metadata of a second virtual object. These steps may be accomplished as described above in connection with FIG. 9. At 1006, control circuitry 704 compares the two sets of environments and, at 1008, determines whether there is a single common environment between the two sets of environments. If there is no single common environment between the two sets of environments, then, at 1010, control circuitry 704 retrieves another set of environments identified by metadata of another virtual object. Processing then returns to 1006, where control circuitry 704 compares all retrieved sets of environments to identify a single common environment between them. If there is a single common environment between the sets of environments, then, at 1012, control circuitry 704 identifies the single common environment as the current environment of the virtual environment.

It is contemplated that the actions or descriptions of FIG. 10 may be used with any other embodiment of this disclosure. In addition, the actions and descriptions described in relation to FIG. 10 may be done in alternative orders or in parallel to further the purposes of this disclosure.

Figure 11:
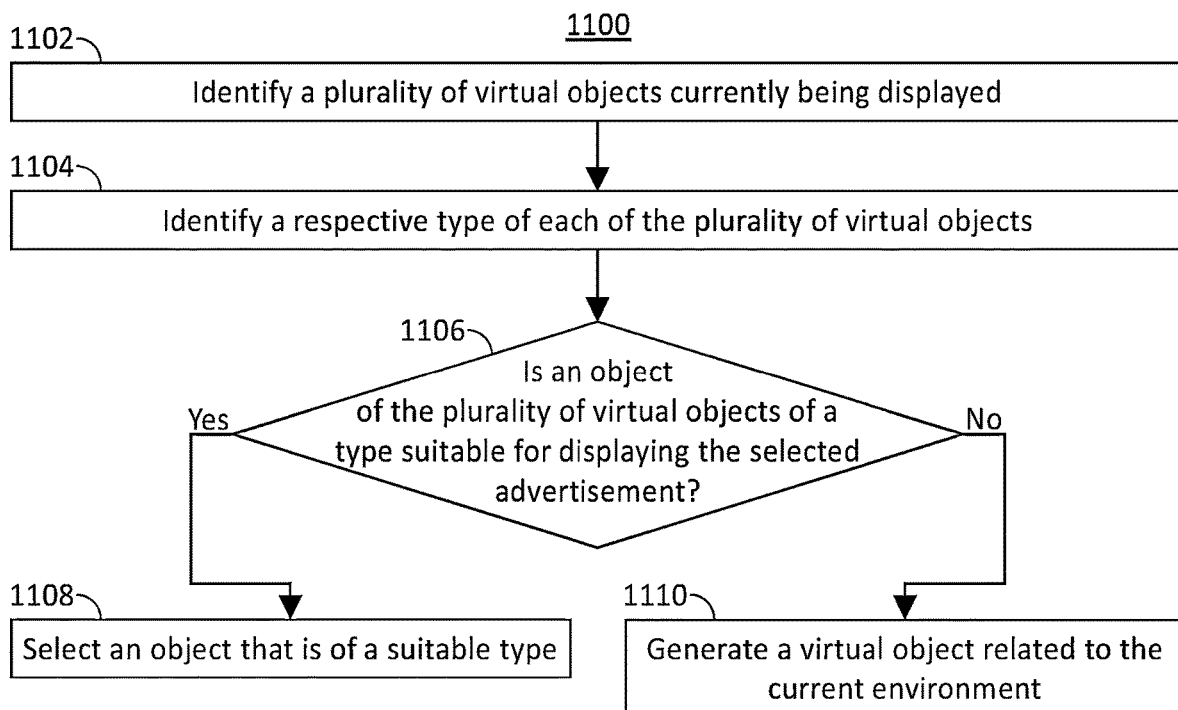
FIG. 11 is a flowchart representing a process for determining whether to generate a new virtual object for display of a contextual advertisement in accordance with some embodiments of the disclosure.

FIG. 11 is a flowchart representing an illustrative process for determining whether to generate a new virtual object for display of a contextual advertisement in accordance with some embodiments of the disclosure. The process 1100 represented in FIG. 11 may be implemented on control circuitry 704, and one or more actions of process 1100 may be incorporated into or combined with one or more actions of any other process or embodiment described herein.

At 1102, control circuitry 704 identifies a number of virtual objects currently being displayed. This may be accomplished using methods described above in connection with FIG. 9.

At 1104, control circuitry 704 identifies a respective type of each virtual object currently being displayed. For example, control circuitry 704 may identify from metadata associated with each respective virtual object whether the respective virtual object is a foreground object or a background object. Control circuitry 704 may alternatively or additionally determine from the metadata whether the respective virtual object is a static object (i.e., the position of the object does not change relative to background objects) or an animated object (i.e., the position of the object changes relative to background objects independently of a user's movement within the virtual environment). Control circuitry 704 may also identify whether the respective virtual object represents a natural object or a man-made object.

At 1106, control circuitry 704 determines whether any object currently being displayed is of a type suitable for displaying the selected advertisement. For example, in determining whether a virtual object represents a natural object (e.g., a tree, cloud, grass, bird, face, etc.) or a man-made object (e.g., building, vehicle, billboard, T-shirt, etc.), control circuitry 704 may further determine whether the object represented by a particular virtual object would normally include an advertisement. If a virtual object currently being displayed is of a type suitable for displaying the selected advertisement, then, at 1108, control circuitry 704 selects the object of a suitable type for display of the selected advertisement. If no virtual objects of a suitable type are currently being displayed, then, at 1110, control circuitry 704 generates a new virtual object related to the current environment as described above in connection with FIG. 8.

It is contemplated that the actions or descriptions of FIG. 11 may be used with any other embodiment of this disclosure. In addition, the actions and descriptions described in relation to FIG. 11 may be done in alternative orders or in parallel to further the purposes of this disclosure.

Figure 12:
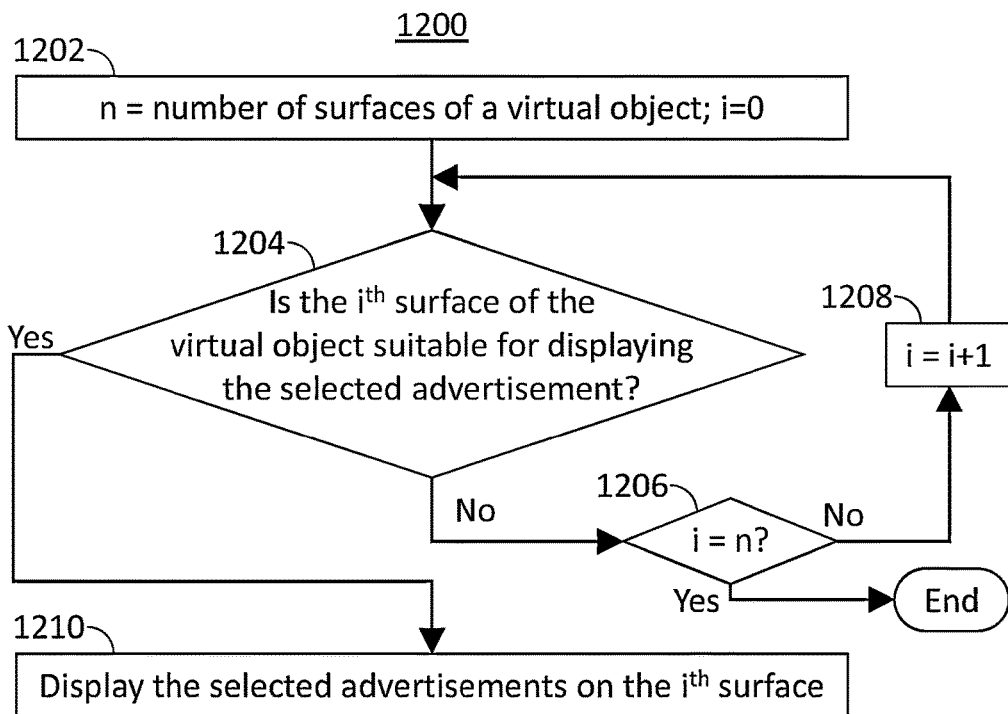
FIG. 12 is a flowchart representing a process for displaying a contextual advertisement on a virtual object in accordance with some embodiments of the disclosure.

FIG. 12 is a flowchart representing an illustrative process for displaying a contextual advertisement on a virtual object in accordance with some embodiments of the disclosure. The process 1200 represented in FIG. 12 may be implemented on control circuitry 704, and one or more actions of process 1200 may be incorporated into or combined with one or more actions of any other process or embodiment described herein.

At 1202, control circuitry 704 determines the number of surfaces of a virtual object and initializes a counter variable i with a value of 0. To determine the number of surfaces of a virtual object, control circuitry 704 may retrieve geometric and/or topological parameters of the virtual object. If the virtual object is a polygon, control circuitry 704 may count the faces of the polygon to determine the number of surfaces. If the virtual object is an irregular object (e.g., an object with curved surfaces), control circuitry 704 may use topological data to determine the number of surfaces.

At 1204, control circuitry 704 determines whether the $i^{th}$ surface of the virtual object is suitable for displaying the selected advertisement. For example, control circuitry 704 determines whether the $i^{th}$ surface is currently facing the user, determines the size of the surface, determines the curvature of the surface, and/or determines the lighting of the surface in order to identify whether the surface is suitable for displaying the selected advertisement. If so, then, at 1210, control circuitry 704 displays the selected advertisement on the $i^{th}$ surface. If not, then, at 1206, control circuitry 704 determines whether all the surfaces of the virtual object have been considered. If not, control circuitry 704, at 1208, increments the value of i and processing returns to 1204.

It is contemplated that the actions or descriptions of FIG. 12 may be used with any other embodiment of this disclosure. In addition, the actions and descriptions described in relation to FIG. 12 may be done in alternative orders or in parallel to further the purposes of this disclosure.

Figure 13:
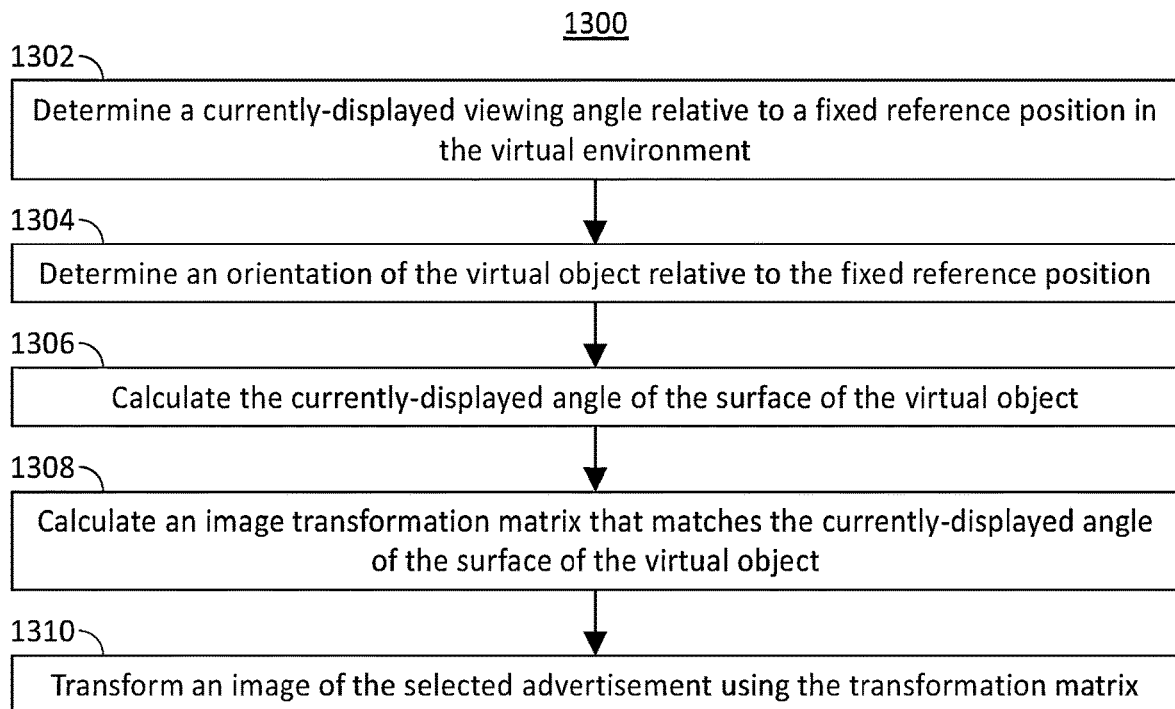
FIG. 13 is a flowchart representing a process for placing a contextual advertisement on a virtual object in accordance with some embodiments of the disclosure.

FIG. 13 is a flowchart representing an illustrative process for placing a contextual advertisement on a virtual object in accordance with some embodiments of the disclosure. The process 1300 represented in FIG. 13 may be implemented on control circuitry 704, and one or more actions of process 1300 may be incorporated into or combined with one or more actions of any other process or embodiment described herein.

At 1302, control circuitry 704, using virtual content processing circuitry 708, determines a currently displayed viewing angle relative to a fixed reference position in the virtual environment. Virtual content processing circuitry 708 identifies a fixed reference position from which all virtual objects are arrayed in a sphere around the user's position within the virtual environment. Any point in the virtual environment can thus be identified by a set of coordinates describing a number of degrees from the reference point in the horizontal plane, a number of degrees above or below the reference point in the vertical plane. Virtual content processing circuitry 708 identifies the coordinates of the point in the center of the user's field of view and calculates the angle between the point and the reference position.

At 1304, control circuitry 704, using virtual content processing circuitry 708, determines an orientation of the virtual object relative to the reference position. For example, a single point, surface edge, or vertex of the virtual object may be tracked by virtual content processing circuitry 708 as a reference point from which to display the virtual object. Virtual content processing circuitry 708 may compare the virtual object reference point with the reference position to determine the orientation of the virtual object.

At 1306, control circuitry 704, using virtual content processing circuitry 708, calculates the currently displayed angle of the surface of the virtual object on which the selected advertisement is to be displayed. Virtual content processing circuitry 708 uses geometry or trigonometry to calculate a position and viewing angle of the virtual object relative to the center of the user's field of view. Then, at 1308, control circuitry 704, using image processing circuitry 732, calculates an image transformation matrix that matches the currently displayed angle of the surface of the virtual object. At 1310, image processing circuitry 732 transforms an image of the selected advertisement using the transformation matrix so that the selected advertisement may seamlessly be displayed on the virtual object.

The above calculations and transformations can also be made using a projected position at which newly generated virtual object may be placed within the virtual environment.

It is contemplated that the actions or descriptions of FIG. 13 may be used with any other embodiment of this disclosure. In addition, the actions and descriptions described in relation to FIG. 13 may be done in alternative orders or in parallel to further the purposes of this disclosure.

Figure 14:
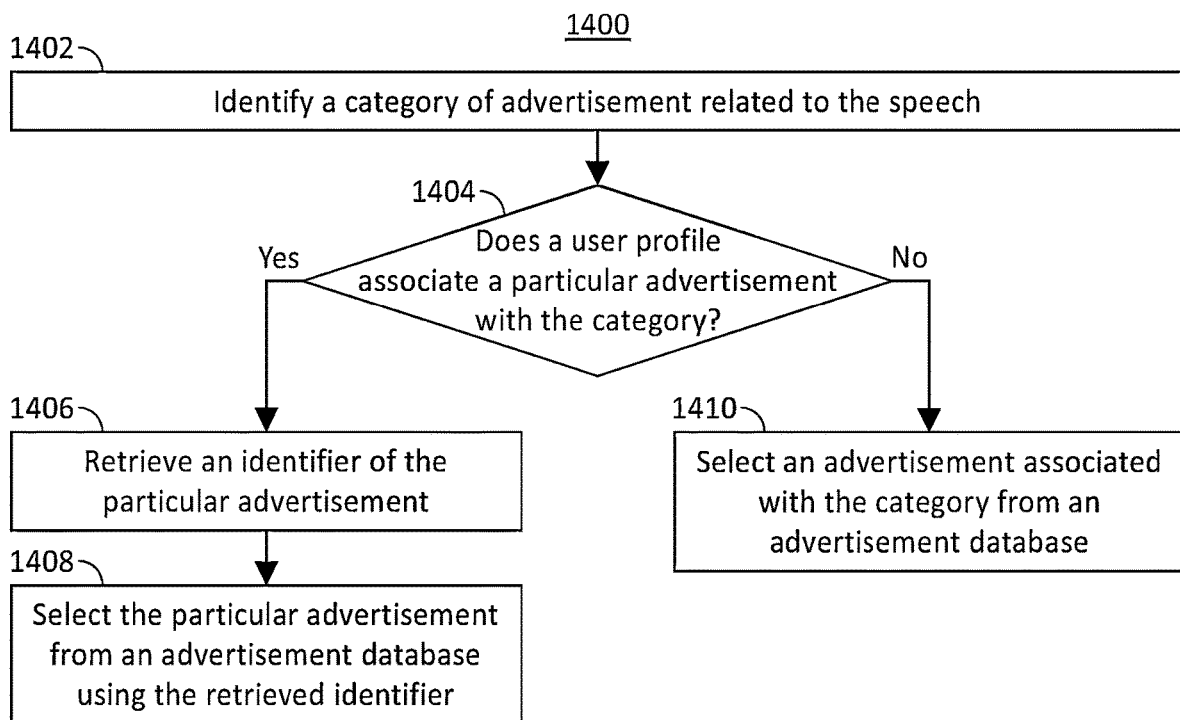
FIG. 14 is a flowchart representing a process for selecting a contextual advertisement for insertion in accordance with some embodiments of the disclosure.

FIG. 14 is a flowchart representing an illustrative process for selecting a contextual advertisement for insertion in according with some embodiments of the disclosure. The process 1400 represented in FIG. 14 may be implemented on control circuitry 704, and one or more actions of process 1400 may be incorporated into or combined with one or more actions of any other process or embodiment herein.

At 1402, control circuitry 704 identifies a category of advertisement related to the speech. For example, the speech may include the keyword "slice" and, using language processing circuitry 720, control circuitry 704 may genericize this keyword to the category of food. At 1404, control circuitry 704 determines whether a user profile associates a particular advertisement with the category. Continuing the above example, control circuitry may determine whether user preferences 724 include a particular brand (e.g., "Joe's Pizza") or other specific advertisement identifier in the category of food. If the user profile does associate a particular advertisement with the category, then, at 1406, control circuitry 704 retrieves an identifier of the particular advertisement and, at 1408, selects the particular advertisement from an advertisement database using the retrieved identifier. If no advertisement is associated with the category, then, at 1410, control circuitry selects an advertisement related to the category from the advertisement database at random.

It is contemplated that the actions or descriptions of FIG. 14 may be used with any other embodiment of this disclosure. In addition, the actions and descriptions described in relation to FIG. 14 may be done in alternative orders or in parallel to further the purposes of this disclosure.

Figure 15:
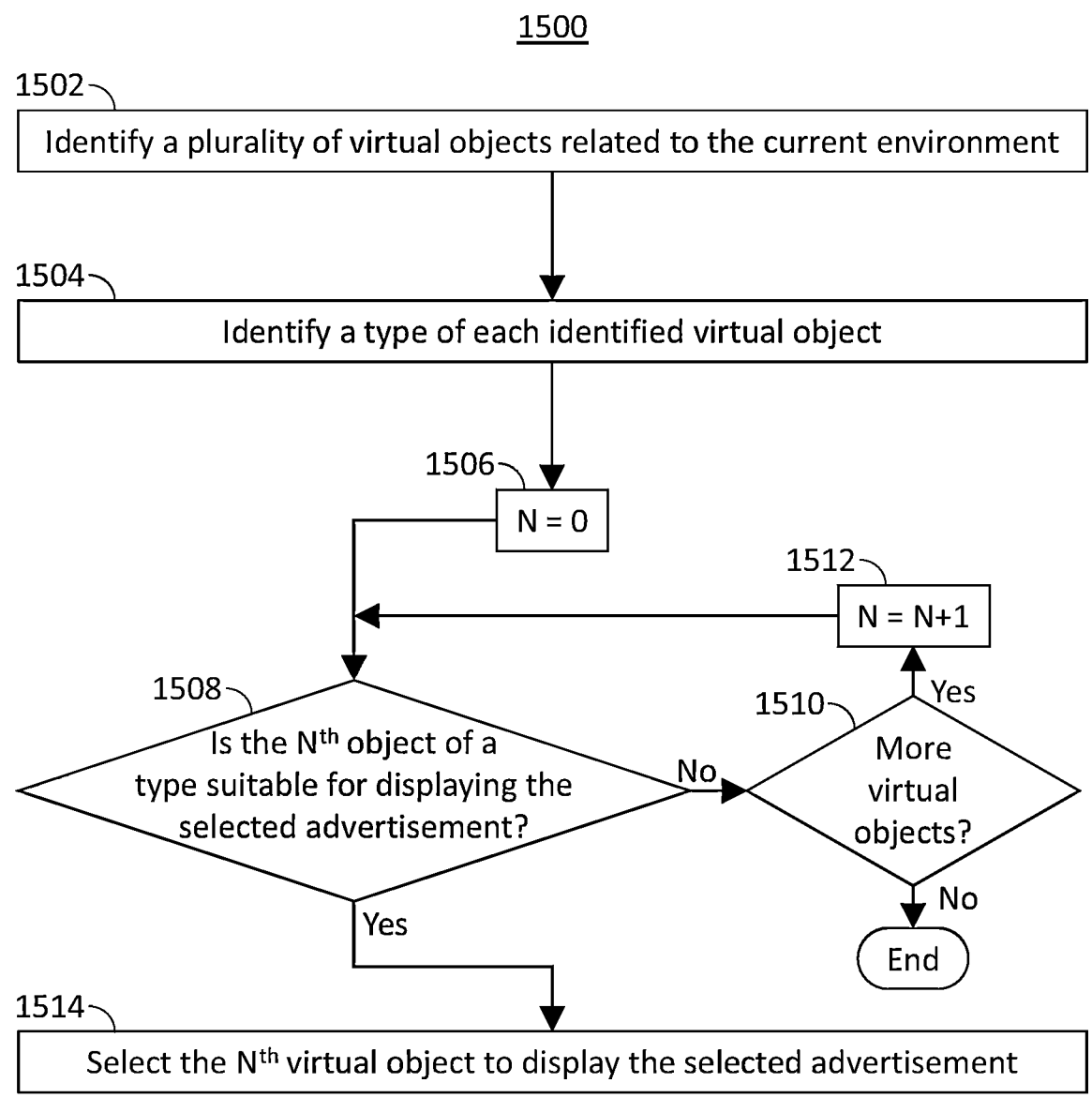
FIG. 15 is a flowchart representing a process for selecting a virtual object on which to display a contextual advertisement in accordance with some embodiments of the disclosure.

FIG. 15 is a flowchart representing an illustrative process for selecting a virtual object on which to display a contextual advertisement. The process 1500 represented in FIG. 15 may be implemented on control circuitry 704, and one or more actions of process 1500 may be incorporated into or combined with one or more actions of any other process or embodiment described herein.

At 1502, control circuitry 704 identifies a number of virtual objects related to the current environment. For example, control circuitry 704 may access a virtual object library and filter the virtual objects to those related to the current environment. At 1504, control circuitry 704 identifies a type of each identified virtual object. This may be accomplished using methods described above in connection with FIG. 11. At 1506, control circuitry initializes a counter variable N with a value of 0, and, at 1508, determines whether the $N^{th}$ object is of a type suitable for displaying the selected advertisement. This may be accomplished using methods described above in connection with FIG. 11. If the object is not of a suitable type, then, at 1510, control circuitry determines whether there are more virtual objects to consider. If so, then, at 1512, control circuitry increments the value of N and processing returns to 1508. If the $N^{th}$ object is of a suitable type for displaying the selected advertisement then, at 1514, control circuitry 704 selects the $N^{th}$ virtual object to display the selected advertisement.

It is contemplated that the actions or descriptions of FIG. 15 may be used with any other embodiment of this disclosure. In addition, the actions and descriptions described in relation to FIG. 15 may be done in alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   generating a set of advertisement placement restrictions based on a user's purchase history related to a particular product, wherein the set of advertisement placement restrictions include restrictions relating to displaying of the particular product;
   receiving audio input that includes a keyword associated with the particular product during presentation of a virtual environment;
   in response to receiving the audio input, identifying a first advertisement related to the particular product;
   determining whether placement of the first advertisement in the virtual environment violates the restrictions relating to displaying of the particular product; and
   in response to determining that placement of the first advertisement in the virtual environment does not violate the restrictions relating to displaying of the particular product:
      determining a first surface, from a plurality of surfaces, and an angle of the first surface of a virtual object displayed in the virtual environment for placement of the first advertisement;
      calculating an image transformation matrix that matches the determined angle of the displayed virtual object;
      transforming an image of the first advertisement using the image transformation matrix to match the determined angle; and
      displaying the virtual object with the transformed image of the first advertisement overlaid over the first surface of the virtual object.

2. The method of claim 1, wherein generating the set of advertisement placement restrictions comprises:
   monitoring the user's purchase history related to the particular product;
   determining, based on the monitoring, that the particular product was previously ordered by the user on an online platform; and
   in response to determining that the particular product was previously ordered by the user on the online platform:
      determining a time of day when the particular product was not ordered; and
      placing a first restriction in the set of advertisement placement restrictions to not display the first advertisement at the time of day when the particular product was not ordered.

3. The method of claim 2, wherein the first restriction is associated with an expiration of time after which the first advertisement is not to be displayed to the user.

4. The method of claim 2, wherein the time of day when the particular product was not ordered is determined based on the particular product's order history that includes at least more than one previous order.

5. The method of claim 1, wherein the first surface of the virtual object is facing the user at a fixed reference position.

6. The method of claim 5, wherein determining the angle of the first surface of the virtual object displayed in the virtual environment comprises:
   determining an orientation of the virtual object relative to the fixed reference position;
   calculating a currently-displayed angle of the first surface of the virtual object.

7. The method of claim 1, wherein the first surface is determined for placement of the first advertisement, from the plurality of surfaces associated with the virtual object based on (a) lighting of the first surface and (b) curvature of the first surface, as viewed from a perspective of the user.

8. The method of claim 1, wherein the first surface is determined for placement of the first advertisement in response to detecting that other surfaces of the virtual object are not suitable for the placement of the first advertisement based on a size of the other surfaces, as viewed from a perspective of the user.

9. The method of claim 1, wherein the virtual object is a static or an animated object.

10. The method of claim 1, further comprising, identifying the virtual environment based on a set of coordinates describing a number of degrees from a reference point in a horizontal plane and a number of degrees above or below the reference point in a vertical plane, as viewed from a perspective of the user.

11. A system comprising:
   control circuitry configured to:
      generate a set of advertisement placement restrictions based on a user's purchase history related to a particular product, wherein the set of advertisement placement restrictions include restrictions relating to displaying of the particular product;
      receive audio input that includes a keyword associated with the particular product during presentation of a virtual environment;
      in response to receiving the audio input, identify a first advertisement related to the particular product;
      determine whether placement of the first advertisement in the virtual environment violates the restrictions relating to displaying of the particular product; and
      in response to determining that placement of the first advertisement in the virtual environment does not violate the restrictions relating to displaying of the particular product:
         determine a first surface, from a plurality of surfaces, and an angle of the first surface of a virtual object displayed in the virtual environment for placement of the first advertisement;
         calculate an image transformation matrix that matches the determined angle of the displayed virtual object;
         transform an image of the first advertisement using the image transformation matrix to match the determined angle; and
         display the virtual object with the transformed image of the first advertisement overlaid over the first surface of the virtual object.

12. The system of claim 11, wherein generating the set of advertisement placement restrictions comprises, the control circuitry configured to:
   monitor the user's purchase history related to the particular product;
   determine, based on the monitoring, that the particular product was previously ordered by the user on an online platform; and
   in response to determining that the particular product was previously ordered by the user on the online platform:
      determine a time of day when the particular product was not ordered; and
      place a first restriction in the set of advertisement placement restrictions to not display the first advertisement at the time of day when the particular product was not ordered.

13. The system of claim 12, wherein the first restriction is associated with an expiration of time after which the first advertisement is not to be displayed to the user.

14. The system of claim 12, wherein the time of day when the particular product was not ordered is determined by the control circuitry based on the particular product's order history that includes at least more than one previous order.

15. The system of claim 11, wherein the first surface of the virtual object is facing the user at a fixed reference position.

16. The system of claim 15, wherein the control circuitry configured to determine the angle of the first surface of the virtual object displayed in the virtual environment is further configured to:
   determine an orientation of the virtual object relative to the fixed reference position;
   calculate a currently-displayed angle of the first surface of the virtual object.

17. The system of claim 11, wherein the first surface is determined by the control circuitry for placement of the first advertisement, from the plurality of surfaces associated with the virtual object, based on (a) lighting of the first surface and (b) curvature of the first surface, as viewed from a perspective of the user.

18. The system of claim 11, wherein the first surface is determined by the control circuitry for placement of the first advertisement in response to detecting that other surfaces of the virtual object are not suitable for the placement of the first advertisement based on a size of the other surfaces, as viewed from a perspective of the user.

19. The system of claim 11, wherein the virtual object is a static or an animated object.

20. The system of claim 11, further comprising, the control circuitry configured to identify the virtual environment based on a set of coordinates describing a number of degrees from a reference point in a horizontal plane and a number of degrees above or below the reference point in a vertical plane, as viewed from a perspective of the user.

* * * * *